Patented Dec. 26, 1950

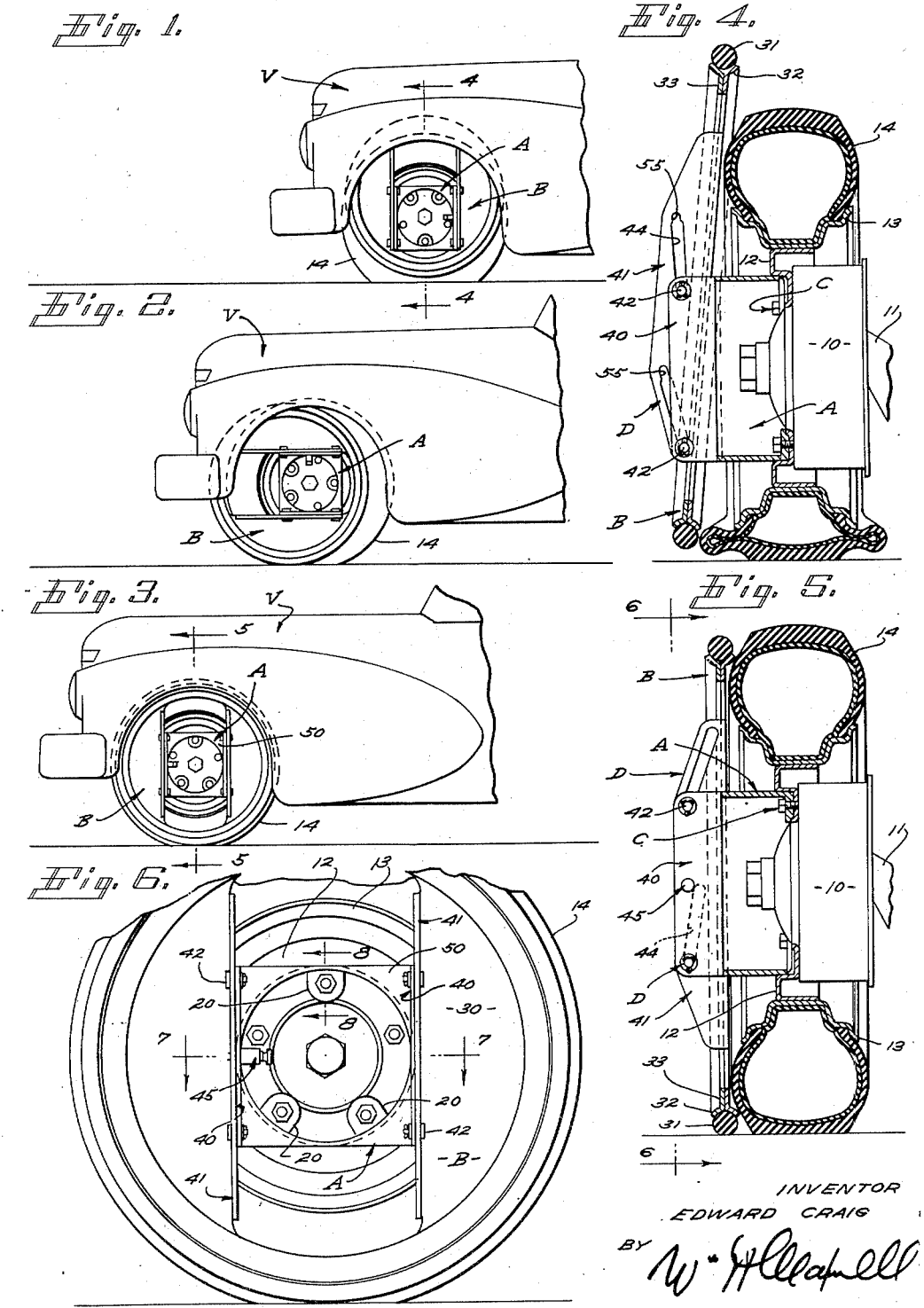

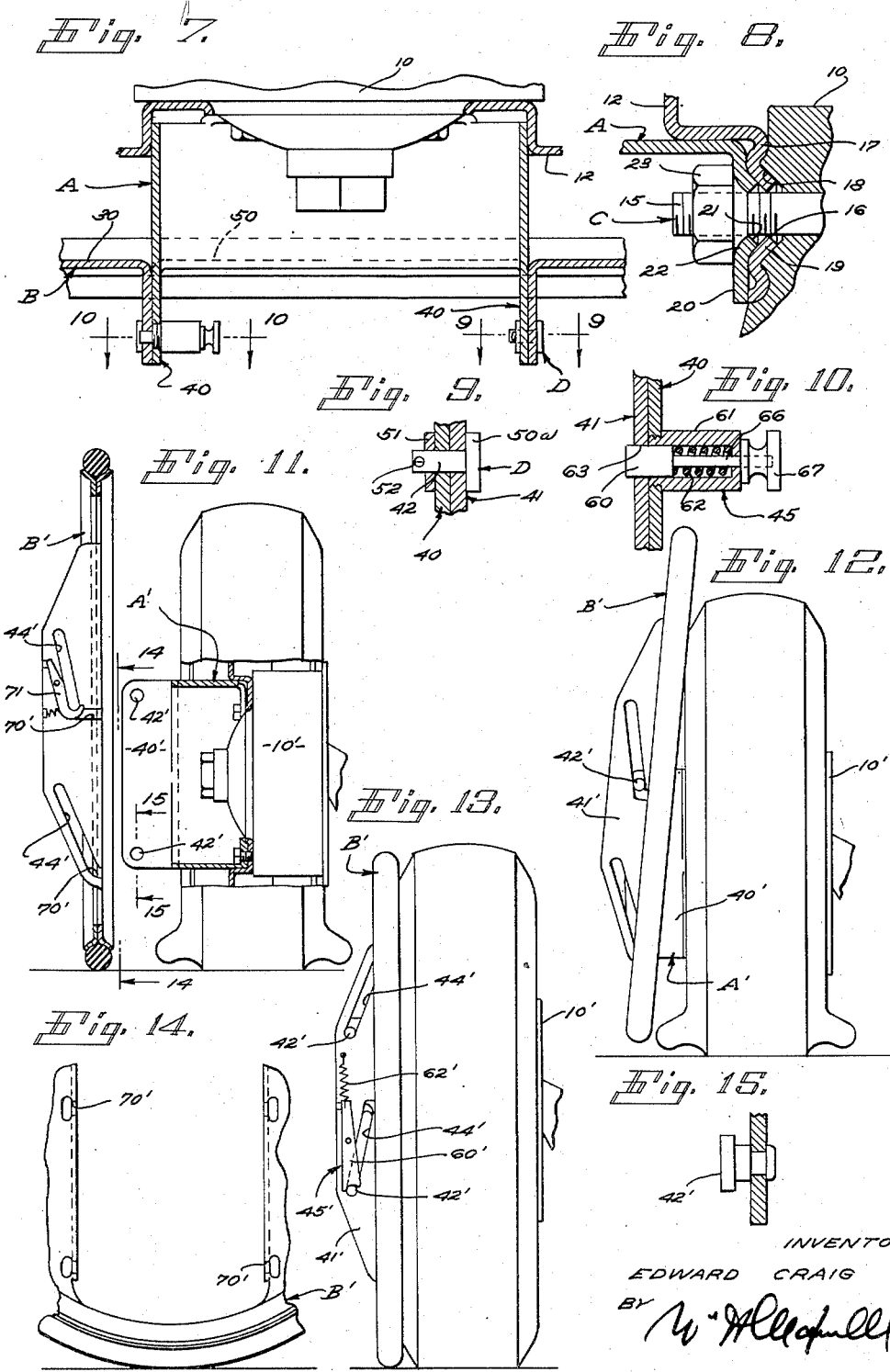

2,535,567

UNITED STATES PATENT OFFICE 2,535,567

AUXILIARY WHEEL FOR MOTOR VEHICLES

Edward Craig, Brea, Calif.

Application May 3, 1948, Serial No. 24,811

15 Claims. (Cl. 301—38)

This invention is concerned with an auxiliary wheel for motor vehicles, it being a general object of the invention to provide a simple, effective, easily operated device serving to lift a vehicle and carry it when a tire thereof is flat.

The usual motor vehicle is equipped with pneumatic tires and when a tire goes flat it is generally most inconvenient and disagreeable to jack up the vehicle and change the tire.

This invention is concerned with the general type of device which is set forth in my copending applications Serial No. 642,271, filed January 19, 1946, now Patent Number 2,483,574, issued October 4, 1949, entitled "Auxiliary Wheel for Motor Vehicles or the Like," and Serial No. 654,749, filed March 15, 1946, now Patent Number 2,466,794, issued April 12, 1949, entitled "Vehicle Support," being a device applicable to a wheel having a flat tire and operating to lift the wheel to a normal or operating position and carry it in that position until a point of repair can be reached.

In a device of the type referred to it is advantageous that the auxiliary wheel be as close as possible to the outer side of the vehicle wheel while operating to carry the vehicle. In practice, however, when a tire is flat and the vehicle wheel is lowered, under which condition the auxiliary wheel is applied, the tire bulges a substantial distance from the side of the vehicle wheel and therefore the ground engaging portion of the auxiliary wheel must initially engage the ground at a point considerably removed from the side of the vehicle wheel. This condition is becoming more serious since there is a definite trend toward the use of larger motor vehicle tires.

It is a general object of the present invention to provide an auxiliary wheel structure initially applied to a vehicle wheel to engage the ground outward of a flat tire on the vehicle wheel and which operates to assume a final operating position immediately adjacent the outer side of the vehicle wheel.

A further object of the present invention is to provide a device of the character referred to that involves but two main sections, both of which are simple and inexpensive in form and construction, and which operate relative to each other to lift the wheel when the vehicle is first operated following application of the device thereto.

It is a further object of the present invention to provide a structure of the general character referred to in which the main sections are coupled so that the device forms a complete assembly or unit that requires no handling or manipulation except mere application to the hub of the vehicle wheel.

A further object of the invention is to provide an attachment for a vehicle wheel in which the sections are separable so that they can be handled separately and finally assembled into operating position on the vehicle wheel or when attached to the hub thereof.

The various objects and features of my invention will be fully understood from the following detailed description of typical preferred forms and applications of the invention, throughout which description reference is made to the accompanying drawings, in which:

Fig. 1 is a side elevation of the forward end portion of a typical motor vehicle showing a front wheel thereof with a flat tire and showing the device of the present invention applied to said wheel. Fig. 2 is a view of the structure shown in Fig. 1, showing it in a partially operated position. Fig. 3 is a view similar to Figs. 1 and 2, showing the structure fully operated or in condition to support the vehicle wheel in a substantially normal position and so that the vehicle can be operated in a limited manner. Fig. 4 is a vertical detailed sectional view of the structure shown in Fig. 1, being a view taken in the direction indicated by line 4—4 on Fig. 1. Fig. 5 is a vertical detailed sectional view showing the parts positioned as illustrated in Fig. 3, being a view taken as indicated by line 5—5 on Fig. 3. Fig. 6 is a side elevation of the parts shown in Fig. 5, being a view taken as indicated by line 6—6 on Fig. 5. Fig. 7 is an enlarged detailed transverse sectional view taken as indicated by line 7—7 on Fig. 6. Fig. 8 is an enlarged detailed sectional view taken as indicated by line 8—8 on Fig. 6. Fig. 9 is an enlarged detailed sectional view taken as indicated by line 9—9 on Fig. 7. Fig. 10 is an enlarged detailed sectional view taken as indicated by line 10—10 on Fig. 7. Fig. 11 is a view illustrating another form of construction wherein the main sections of the structure are separable showing the hub section of the device applied to the hub of the vehicle wheel and showing the wheel section of the device in position ready to be applied to the hub section. Fig. 12 is a view of the structure shown in Fig. 11 showing the sections coupled ready for operation. Fig. 13 is a view similar to Fig. 12 but showing the wheel section operated to full operating position where it supports the vehicle wheel in a substantially normal position, and Fig. 14 is a view taken as indicated by line 14—14 on Fig. 11, Fig. 15 is a view taken on line 15—15 in Fig. 11.

The device of the present invention is in the nature of an attachment applicable to the rim of a motor vehicle, and in the drawings it is shown applied to a typical motor vehicle construction wherein the vehicle V has a hub 10 supported from an axle 11 and carrying a wheel 12 with a rim 13 supporting a pneumatic tire 14. In Figs. 1 and 4 of the drawings the tire is shown flat or deflated, in which case the wheel 12 has lowered and the tire bulged at the ground to project a substantial distance from either side of the wheel. In Figs. 3, 5 and 6, the deflated wheel of the vehicle is shown lifted so that the deflated tires assumes a substantially normal form or cross sectional configuration at the ground and is not pinched between the vehicle wheel and the ground.

The structure provided by the present invention, as shown in Figs. 1 to 10, inclusive, involves, generally, two main sections, one a hub section A, the other a wheel section B, mounting means C securing the hub section to the hub 10 of the vehicle and coupling means D joining the sections A and B for operation between an initial or eccentric position where the wheel section engages the ground beside the flat tire, as shown in Fig. 4, and a final operating or concentric position where the wheel section is concentric with the vehicle wheel and is immediately adjacent thereto as shown in Fig. 5.

The hub section A of the device may vary widely in form and construction. The preferred form of hub section illustrated in the drawings involves a simple tubular or cylindrical element forming the hub section. The tubular hub section A is shown about the same size or diameter as the hub 10 of the vehicle and is secured to the hub 10 through the mounting means C so that it is concentric therewith and projects from the outer side thereof. The hub section A is of sufficient length or extent axially to support the wheel section B of the device in the desired position relative to the vehicle wheel, as shown in Figs. 4 and 5 of the drawings.

The mounting means C provided for handling the hub section or for securing it to the wheel 12 or hub 10 of the wheel may vary in accordance with details or features of construction employed in the hub 10 or the mounting of the wheel 12 on the hub 10. In the particular case illustrated the hub 10 is provided at its outer side or face with a plurality of studs 15 which extend through openings 16 in the flange 17 of wheel 12. In the particular case illustrated the outer face of the hub is recessed at 18 around each stud 15 and the flange 17 is cupped at 19 around each opening 16, so that the cupped portions engage in the recesses 18 in the manner common to motor vehicle construction.

When the present invention is applied to a conventional motor vehicle construction such as shown in the drawings, the mounting means C may include a plurality of lugs 20 at the inner end of the hub section A to be applied to studs 15 of the hub 10. In the particular case illustrated, where the hub section A is about the same size or diameter as the hub 10 of the vehicle the lugs 20 project radially inward to the inner end of the hub, and in the case illustrated there are three lugs circumferentially spaced, as clearly shown in Fig. 6 of the drawings. Each lug 20 is provided with an opening 21 passing a stud 15 and the lug is cupped at 22 surrounding the opening 21 to engage in the cupped portion of the wheel flange where it may be clamped by a suitable clamp nut 23 applied to the stud.

It will be apparent from the foregoing description that the mounting means C is such as to secure the hub section A to the hub 10 of the vehicle to be concentric therewith and to project outwardly from the outer side thereof and it will be apparent that the hub section may be attached to the hub by merely removing three clamp nuts 23 in order that the lugs 20 of the mounting means may be engaged under them.

The wheel section B preferably involves a simple flat plate 30 with a round periphery having a rim that carries a tire 31. In the case illustrated the tire carrying rim of the wheel is formed by a pair of flanges 32 one of which is formed directly on the periphery of the plate while the other is on a ring 33 which is secured to the plate. In practice the tire 31 employed on the wheel section may vary in form or type, it being preferred in most cases to employ a hard rubber tire which may be substantially round in cross section and which has an outside diameter substantially the same as that of the vehicle tire 14 for which it substitutes in the case of an emergency.

The coupling means D joins the sections A and B so that they are shiftable between the initial or eccentric position where the lower portion of the wheel section is far enough removed from the tire of the wheel to engage the ground clear of the flat tire, as shown in Fig. 4, and an operating position where the wheel section is concentric with the vehicle wheel and is located immediately adjacent the vehicle tire as shown in Fig. 5.

The coupling means involves, generally, cooperating parts on the sections A and B having sliding engagement so that the wheel section moves diametrically of the hub section and may tilt relative thereto. The cooperating parts, as shown in the drawings, may involve hub flanges 40 projecting from the hub section and wheel flanges 41 projecting from the wheel section. The coupling means D involves connecting means joining the flanges 40 and 41, which connecting means preferably includes connecting pins 42 operating in slots 44. The coupling means further involves latch means 45 engaged when the wheel section reaches a position concentric with the vehicle wheel to releasably hold the wheel section in that position as the wheel section supports the vehicle wheel and rolls along the ground holding the vehicle wheel supported.

The hub flanges 40 may vary considerably in form, arrangement and construction, it being preferred that there be two spaced parallel flanges 40 and that they be carried on or by the outer end of the hub section A to project outwardly therefrom and to extend parallel with an axis extending diametrically through the central longitudinal axis of the hub. In the case illustrated an end plate 50 is mounted on or carried by the outer end of the hub A and the flanges 40 are formed on or project from the plate 50, as shown throughout the drawings. It is preferred that the plates be spaced apart or that they be arranged at diametrically opposite sides of the central axis of the hub so that they are substantially tangential to the periphery of the hub section, as shown in Fig. 6 of the drawings. Through this construction the plate 50 that carries the flanges 40 projects radially outward from the outer end of the hub section, leaving the interior of the hub section open and unobstructed so that the mounting means C can be conveniently reached from the outer side of the device.

The wheel flanges 41 are formed on or project from the plate 30 of the wheel section and in the preferred arrangement they project from the outer side of the wheel plate. The wheel flanges are parallel with each other and extend parallel with an axis that extends diametrically through the center of the wheel section and they are so spaced as to have sliding engagement with the hub flanges. In the arrangement illustrated the hub flanges 40 are confined between the wheel flanges, in which case the outer sides or faces of the hub flanges slidably engage the inner sides or faces of the wheel flanges.

The connecting pins 42 provided to connect the flanges 40 and 41 serve to connect the flanges so that the wheel section is allowed free movement relative to the hub section between a position such as is shown in Fig. 4, and that shown in Fig. 5. In the preferred arrangement there are two connecting pins 42 carried by each hub flange 40, the pins being located at the end portions of the flanges to project from the inner sides of the flanges so that they engage in openings 44 in the wheel flanges. The openings 44 in the wheel flanges are in the form or nature of slots, in fact, they are cam slots shaped and proportioned to act with the pins to shift or rock the wheel section from a tilted position such as is shown in Fig. 4 to a vertical position such as is shown in Fig. 5, as the wheel section moves from the eccentric position to the concentric position. It will be apparent from a consideration of Figs. 4 and 5 of the drawings that the slots 44 which accommodate the pins 42, uppermost when the structure is positioned as shown in Fig. 4, are shaped or inclined differently from the slots which are lowermost when the structure is thus positioned, with the result that the desired tilting or angular correction of the wheel section occurs as the wheel section is moved from the eccentric to the concentric position.

In the form of the invention under consideration the pins 42 serve to permanently join or connect the flanges 40 and 41 so that the hub and wheel sections are connected together as a unitary assembly. In this case each pin 42 is provided at one end with a head 50a and carries a retaining washer 51 which is held by a lock pin 52. The flanges engaged by the pin are confined between the head 50 and washer 51 as shown in Fig. 9.

In practice it is preferred that the pin and slot construction above described be loose or free so that the wheel section moves freely relative to the hub section in operating between the position shown in Fig. 4 and that shown in Fig. 5. In the construction shown in the drawings the slots 44 are considerably larger than the pins that operate in them, except at the end portions 55 which receive the pins when the structure is in operating position, as shown in Fig. 5. The end portions 55 are such as to snugly receive the pins in order to hold the sections A and B in operating position without allowing unnecessary play or freedom of movement between them as the device rolls on the ground.

The latch means 45 serves to releasably retain the sections A and B in the position shown in Fig. 5. In the case illustrated in the drawings the latch means involves a latch member 60 slidably carried in a guide 61 on one of the flanges. The latch 60 is urged by a spring 62 to enter an opening 63 in an adjoining flange when the parts reach the position shown in Fig. 5. In the construction shown in Fig. 10 the latch guide 61 houses the spring 62 and a stem 66 projects from the latch and carries an operating knob 67 conveniently accessible so that the latch can be withdrawn from the opening 63 to free the flanges so that the structure may be moved from the position shown in Fig. 5.

In the form of the invention illustrated in Figs. 11 to 15, inclusive, the wheel section B' is separable from the hub section A', enabling the operator to apply the hub section A' to the hub 10' of the vehicle before the wheel section is attached to the hub section. Various constructions may be employed to facilitate separation of the sections A' and B'. In the case illustrated in the drawings the flanges 40' of the hub section are releasably coupled to the flanges 41' of the wheel section by fixed pins 42' on the hub flanges which operate in slot-like openings 44' in the wheel flanges, which openings have extensions 70' forming entrance channels through which the pins 42' can be moved into and out of operating position in the openings 44'.

When this construction is employed it is desirable to provide closures for the openings 44' so that the pins 42' may be releasably retained in the openings 44' upon the sections A' and B' being assembled ready for operation, as shown in Fig. 12 of the drawings. In the case illustrated a hinged closure 71 is provided in connection with one or more of the openings 44' and serves to releasably close the end of the opening at which the extension 70' occurs.

In the form of the invention shown in Figs. 11 to 14 the latch means 45' is somewhat different than that above described. In this case the latch means involves a pivoted latch 60' normally held by a spring 62' in such position as to engage and hold a connecting pin 42' at the end of the cam opening 44' when the wheel section has been moved to the operating position, as shown in Fig. 13. It will be apparent from Fig. 13 how the latch 60' may be arranged and proportioned so that it is depressed as the pin 42' moves to the end of opening 44', and it will be apparent how the latch can be readily released or disengaged from the pin when it is desired to release the sections from operating position, as shown in Fig. 13.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. An attachment for a vehicle wheel carrying a tire including, a hub section, a wheel section, mounting means securing the hub section concentrically at the outer side of the wheel, and coupling means between the sections joining the sections for limited movement of the wheel section relative to the hub section diametrically of the wheel and also axially thereof including, a flange on the hub section extending parallel with a diametric axis of the hub and parallel with the axis of the wheel, a flange on the wheel section slidably engaged with the flange of the hub section and extending parallel therewith and shiftable transversely of the wheel and also axially thereof, and a member on one flange operating in a cam slot in the other flange, which cam slot extends axially and transversely of the wheel.

2. An attachment for a vehicle wheel carrying a tire including, a hub section, a wheel section, mounting means securing the hub section concentrically at the outer side of the wheel, and coupling means between the sections joining the sections for limited movement of the wheel section relative to the hub section diametrically of the wheel and axially thereof including, a flange on the hub section extending parallel with a diametric axis of the hub, a flange on the wheel section slidably engaged with the flange of the hub section and extending parallel therewith, and a member on one flange operating in a slot in the other flange extending longitudinally of the flanges and also axially of the wheel.

3. An attachment for a vehicle wheel carrying a tire including, a hub section, a wheel section, mounting means securing the hub section concentrically at the outer side of the wheel, and coupling means between the sections joining the sections for limited movement of the wheel section relative to the hub section diametrically of the wheel and axially thereof including, a flange on the hub section extending parallel with a diametric axis of the hub, a flange on the wheel section slidably engaged with the flange of the hub section and extending parallel therewith, and members on one flange spaced apart longitudinally of that flange and operating in cam slots in the other flange, the cam slots extending longitudinally of said other flange and also axially of the wheel so that as the wheel section moves from a position eccentric to the wheel it shifts axially of the wheel to a position adjacent the wheel.

4. An attachment for a vehicle wheel carrying a tire including, a hub section, a wheel section, mounting means securing the hub section concentrically at the outer side of the wheel, and coupling means between the sections joining the sections for limited movement of the wheel section relative to the hub section diametrically of the wheel and also axially thereof including, a flange on the hub section, a flange on the wheel section slidably engaged with the flange on the hub section to move axially and radially of the wheel, and spaced members on one flange engaged in spaced cam slots in the other flange and coupling the sections against separation one of the slots being of greater extent than the other axially of the wheel.

5. An attachment for a vehicle wheel carrying a tire including, a hub section, a wheel section, mounting means securing the hub section concentrically at the outer side of the wheel, and coupling means between the sections joining the sections for limited movement of the wheel section relative to the hub section diametrically of the wheel and axially thereof including, a flange on the hub section, a flange on the wheel section slidably engaged with the flange on the hub section to move axially and radially of the wheel, and spaced members on one flange engaged in differently pitched cam slots in the other flange, the said members being removable from the slots to free the sections from each other and operating in the slots to tilt the wheel section as it is moved diametrically of the hub section.

6. An attachment for a vehicle wheel carrying a tire including, a hub section, a wheel section, mounting means securing the hub section concentrically at the outer side of the wheel, and coupling means between the sections joining the sections for limited movement of the wheel section relative to the hub section diametrically of the wheel and axially thereof including, a flange on the hub section, a flange on the wheel section slidably engaged with the flange on the hub section for movement axially and also diametrically of the wheel section, and a member on one flange engaged in a cam slot in the other flange, the slot extending axially and also transversely of the wheel section and being open at one end to pass the said member into and out of the slot.

7. An attachment for a vehicle wheel carrying a tire including, a hub section, a wheel section, mounting means securing the hub section concentrically at the outer side of the wheel, and coupling means between the sections joining the sections for limited movement of the wheel section relative to the hub section diametrically of the wheel and axially thereof including, a flange on the hub section, a flange on the wheel section slidably engaged with the flange on the hub section for movement axially and also diametrically of the wheel section, a member on one flange engaged in a cam slot in the other flange extending across and also axially of the wheel section, and a latch releasably retaining the said member in the slot.

8. An attachment for a vehicle wheel mounted on a hub and carrying a tire including, a tubular hub section, lugs projecting inwardly at one end of the hub section mounting the hub section on the hub concentric therewith to project outwardly therefrom, a wheel section having a round center plate and a tire thereon, spaced parallel elongate hub section flanges projecting from the outer end of the hub section in planes parallel with the axis of the hub section and extending parallel with an axis diametric of the hub section, spaced parallel elongate wheel section flanges projecting from the inner side of the plate and slidably engaged with the hub section flanges, pins projecting from the end portions of the hub section flanges into cam slots in the wheel section flanges, the slots extending longitudinally of the flanges and also axially of the wheel section, and a latch releasably coupling the sections against relative movement upon being moved to positions where they are concentric.

9. An attachment for a vehicle wheel mounted on a hub and carrying a tire including, a tubular hub section, lugs projecting inwardly at one end of the hub section mounting the hub section on the hub concentric therewith to project outwardly therefrom, a wheel section having a round center plate and a tire thereon, spaced parallel elongate hub section flanges projecting from the outer end of the hub section in planes parallel with the axis of the hub section and extending parallel with an axis diametric of the hub section, spaced parallel elongate wheel section flanges projecting from the inner side of the plate and slidably engaged with the hub section flanges, pins projecting from the end portions of the hub section flanges into cam slots in the wheel section flanges, the slots extending longitudinally of the flanges and also axially of the wheel section, and a latch releasably coupling the sections against relative movement upon being moved to positions where they are concentric, the pins permanently connecting the sections together.

10. An attachment for a vehicle wheel mounted on a hub and carrying a tire including, a tubular hub section, lugs projecting inwardly at one end of the hub section mounting the hub section on the hub concentric therewith to project outwardly therefrom, a wheel section having a round center plate and a tire thereon, spaced parallel elongate hub section flanges projecting from the outer end of the hub section in planes parallel with the axis of the hub section and extending parallel with an axis diametric of the hub section, spaced parallel elongate wheel section flanges projecting from the inner side of the plate and slidably engaged with the hub section flanges, pins projecting from the end portions of the hub section flanges into cam slots in the wheel section flanges, the slots extending longitudinally of the flanges and also axially of the wheel section, a latch releasably coupling the sections against relative movement upon being moved to positions where they are concentric, each slot being open at one end, and a releasable closure at the open end of each slot.

11. An attachment for a vehicle wheel carrying a tire including, a hub section, a wheel section, mounting means securing the hub section concentrically at the outer side of the wheel, and coupling means between the sections including engaged members, one on each section, and means on one of said members extending axially and diametrically of the wheel and rocking the wheel section axially from a tilted position where it is inclined to a plane parallel with that of the wheel to a working position in a plane parallel with that of the wheel upon movement of the sections relative to each other diametrically of the wheel.

12. An attachment for a vehicle wheel carrying a tire including, a hub section, a wheel section, mounting means securing the hub section concentrically at the outer side of the wheel, and coupling means between the sections including, engaged parallel elongate members, one on each section and extending diametrically of the sections and also axially of the wheel, and means on one of said members extending axially and diametrically of the wheel and rocking the wheel section axially from a tilted position where it is inclined to a plane parallel with that of the wheel to a working position in a plane parallel with that of the wheel upon movement of the sections relative to each other diametrically of the wheel.

13. An attachment for a vehicle wheel carrying a tire including, a hub section, a wheel section, mounting means securing the hub section concentrically at the outer side of the wheel, and coupling means between the sections including, engaged parts on the sections extending parallel with axes diametric of the sections, and a cam on one of the said parts extending axially and diametrically of the sections and rocking the sections axially from a tilted position where they are inclined to a plane parallel with that of the wheel to a working position in a plane parallel with that of the wheel upon movement of the sections relative to each other diametrically of the wheel.

14. An attachment for a vehicle wheel carrying a tire including, a hub section, a wheel section, mounting means securing the hub section concentrically at the outer side of the wheel, and coupling means between the sections including, spaced parallel flanges on the hub section disposed in planes parallel with the axis of the wheel, spaced parallel flanges on the wheel section slidably engaging the flanges on the hub section to move axially and also radially of the wheel, cam parts on the flanges of one section and extending axially of the wheel, and pins on the flanges of the other section engaging the cam parts, the cam parts and pins cooperating to move the wheel section from a tilted position inclined relative to the wheel to a working position parallel with the wheel when it is operated transversely of the hub section.

15. An attachment for a vehicle wheel carrying a tire including, a tubular hub section with wheel engaging means at one end, a wheel section, mounting means securing the hub section concentrically at the outer side of the wheel, and coupling means between the sections including spaced parallel flanges on the other end of the hub section disposed in planes parallel with the axis of the wheel, spaced parallel flanges on the wheel section slidably engaging the flanges on the hub section to move axially and also radially of the wheel, cam parts on the flanges of one section and extending axially of the wheel, and pins on the flanges of the other section engaging the cam parts, the cam parts and pins cooperating to move the wheel section from a tilted position inclined relative to the wheel to a working position parallel with the wheel when it is operated transversely of the hub section.

EDWARD CRAIG.

REFERENCES CITED

The following references are of record in the file of this patent:

UNITED STATES PATENTS

| Number | Name | Date |
| --- | --- | --- |
| 1,846,448 | Nelson | Feb. 23, 1932 |
| 1,950,998 | Quinn | Mar. 13, 1934 |
| 2,466,794 | Craig | Apr. 12, 1949 |